(12) United States Patent
Yang (10) Patent No.: US 7,548,986 B1
(45) Date of Patent: Jun. 16, 2009

(54) ELECTRONIC DEVICE NETWORK PROVIDING STREAMING UPDATES

(75) Inventor: Xuguang Yang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 986 days.

(21) Appl. No.: 10/802,191

(22) Filed: Mar. 17, 2004

Related U.S. Application Data (60) Provisional application No. 60/455,184, filed on Mar. 17, 2003.

(51) Int. Cl.
*G06F 15/16* (2006.01)
(52) U.S. Cl. ...................................... 709/231
(58) Field of Classification Search ................... 709/231
See application file for complete search history.

(56) References Cited

U.S. PATENT DOCUMENTS

| | | | |
|---|---|---|---|
| 5,261,055 A | 11/1993 | Moran et al. | 395/275 |
| 5,442,771 A | 8/1995 | Filepp et al. | 395/650 |
| 5,479,637 A | 12/1995 | Lisimaque et al. | 395/430 |
| 5,579,522 A | 11/1996 | Christeson et al. | 395/652 |
| 5,596,738 A | 1/1997 | Pope | 395/430 |
| 5,598,534 A | 1/1997 | Haas | 395/200.09 |
| 5,608,910 A | 3/1997 | Shimakura | 395/670 |
| 5,623,604 A | 4/1997 | Russell et al. | 395/200.1 |
| 5,666,293 A | 9/1997 | Metz et al. | 395/200.5 |
| 5,752,039 A | 5/1998 | Tanimura | 395/712 |
| 5,778,440 A | 7/1998 | Yiu et al. | 711/154 |
| 5,790,974 A | 8/1998 | Tognazzini | 701/204 |
| 5,864,681 A * | 1/1999 | Proctor et al. | 709/247 |
| 5,878,256 A | 3/1999 | Bealkowski et al. | 395/652 |
| 5,946,686 A * | 8/1999 | Schmuck et al. | 707/10 |
| 5,950,199 A * | 9/1999 | Schmuck et al. | 707/8 |
| 5,960,445 A | 9/1999 | Tamori et al. | 707/203 |
| 5,973,626 A * | 10/1999 | Berger et al. | 341/65 |
| 5,987,477 A * | 11/1999 | Schmuck et al. | 707/201 |
| 6,009,497 A | 12/1999 | Wells et al. | 711/103 |
| 6,032,216 A * | 2/2000 | Schmuck et al. | 710/200 |
| 6,038,636 A | 3/2000 | Brown, III et al. | 711/103 |
| 6,064,814 A | 5/2000 | Capriles et al. | 395/701 |

(Continued)

FOREIGN PATENT DOCUMENTS

CA 2339923 3/2000

(Continued)

OTHER PUBLICATIONS

"Focus on OpenView A guide to Hewlett-Packard's Network and Systems Management Platform", Nathan J. Muller, pp. 1-291, CBM Books, published 1995.

(Continued)

*Primary Examiner*—William C Vaughn, Jr.
*Assistant Examiner*—Thomas Richardson (57) ABSTRACT

Discloses herein is wireless electronic device network employing a stream processing generator to generate updates in electronic devices capable of updating firmware and/or software contained therein. The stream processing generator may only use a small buffer of content for buffering information when transforming an original file into a new file. The stream processing generator is adapted to read a portion of in a file or a portion of a stream of content during processing and may fetch small blocks of data at a time and generate the difference information corresponding thereto.

28 Claims, 4 Drawing Sheets

U.S. PATENT DOCUMENTS

| | | | |
|---|---|---|---|
| 6,073,206 A | 6/2000 | Piwonka et al. | 711/102 |
| 6,073,214 A | 6/2000 | Fawcett | 711/133 |
| 6,088,759 A | 7/2000 | Hasbun et al. | 711/103 |
| 6,105,063 A | 8/2000 | Hayes, Jr. | 709/223 |
| 6,112,024 A | 8/2000 | Almond et al. | 395/703 |
| 6,112,197 A | 8/2000 | Chatterjee et al. | 707/3 |
| 6,126,327 A | 10/2000 | Bi et al. | 395/200.51 |
| 6,128,695 A | 10/2000 | Estakhri et al. | 711/103 |
| 6,157,559 A | 12/2000 | Yoo | 365/52 |
| 6,163,274 A | 12/2000 | Lindgren | 340/825.44 |
| 6,198,946 B1 | 3/2001 | Shin et al. | 455/561 |
| 6,279,153 B1 | 8/2001 | Bi et al. | 717/11 |
| 6,311,322 B1 | 10/2001 | Ikeda et al. | 717/1 |
| 6,438,585 B2 | 8/2002 | Mousseau et al. | 709/206 |
| 6,671,703 B2 * | 12/2003 | Thompson et al. | 707/202 |
| 6,999,976 B2 * | 2/2006 | Abdallah et al. | 707/200 |
| 7,103,779 B2 * | 9/2006 | Kiehtreiber et al. | 713/187 |
| 7,188,214 B1 * | 3/2007 | Kasriel et al. | 711/118 |
| 7,251,697 B2 * | 7/2007 | Piotrowski | 709/231 |
| 7,274,671 B2 * | 9/2007 | Hu | 370/256 |
| 7,324,514 B1 * | 1/2008 | Haq et al. | 370/392 |
| 2001/0029178 A1 | 10/2001 | Criss et al. | 455/419 |
| 2001/0047363 A1 | 11/2001 | Peng | 707/104.1 |
| 2001/0048728 A1 | 12/2001 | Peng | 375/354 |
| 2002/0078209 A1 | 6/2002 | Peng | 709/227 |
| 2002/0091807 A1 * | 7/2002 | Goodman | 709/221 |
| 2002/0116261 A1 | 8/2002 | Moskowitz et al. | 705/14 |
| 2002/0131404 A1 | 9/2002 | Mehta et al. | 370/352 |
| 2002/0152005 A1 | 10/2002 | Bagnordi | 700/234 |
| 2002/0156863 A1 | 10/2002 | Peng | 709/217 |
| 2002/0157090 A1 | 10/2002 | Anton, Jr. | 717/178 |
| 2003/0033599 A1 | 2/2003 | Rajaram et al. | 717/173 |
| 2003/0037075 A1 | 2/2003 | Hannigan et al. | 707/500 |
| 2003/0061384 A1 | 3/2003 | Nakatani | 709/245 |
| 2003/0177255 A1 * | 9/2003 | Yun | 709/231 |
| 2003/0212742 A1 * | 11/2003 | Hochmuth et al. | 709/204 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1st ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

ELECTRONIC DEVICE NETWORK PROVIDING STREAMING UPDATES

CROSS-REFERENCE TO RELATED APPLICATIONS

The present application claims the benefit of priority of U.S. Provisional patent application having Ser. No. 60/455,184, filed on Mar. 17, 2003, and hereby incorporates herein by reference the complete subject matter thereof, in its entirety.

The present application also hereby incorporates herein by reference the complete subject matter of PCT application having publication number WO/02/41147 A1, and having application number PCT/US01/44034, filed on Nov. 19, 2001, in its entirety.

The present application also hereby incorporates herein by reference the complete subject matter of U.S. Provisional patent application having Ser. No. 60/249,606, filed on Nov. 17, 2000, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. These firmware and application software often contain software bugs. New versions of the firmware and software are periodically released to fix the bugs or to introduce new features, or both.

Electronic devices, such as mobile handsets, access servers to retrieve updates that are needed to update firmware and/or software. Creating efficient and compact updates for firmware/software updates is important. Creating an update agent that can process these update packages efficiently on the mobile handset is also a great challenge. Creating such solutions adapted to work in a plurality wireless networks is also important.

Further limitations and disadvantages of conventional and traditional approaches will become apparent to one of skill in the art, through comparison of such systems with some aspects of the present invention as set forth in the remainder of the present application with reference to the drawings appended hereto.

SUMMARY OF THE INVENTION

Aspects of the present invention may be found in a stream processing generator of difference information. The stream processing generator may comprise a first stream of information. The first stream of information may comprise a plurality of first bytes of data. The stream processing generator may also comprise a second stream of information. The second stream of information may comprise a plurality of second bytes of data. The stream processing generator may also comprise an operation array storing operations for tree-based encoding of the first and second streams of information. The stream processing generator may simultaneously transform the first and second streams of information, analyze the plurality of first and second bytes of data encountered in the first and second streams of information, determine difference information between the first and second streams of information, and output the difference information between the first and second streams of information.

In an embodiment according to the present invention, the stream processing generator may further comprise a differencing component computing and expressing the difference information employing a differencing instruction set.

In an embodiment according to the present invention, the differencing instruction set may comprise at least one operation selected from a match operation, an insert operation, a delete operation, and a replace operation.

In an embodiment according to the present invention, the stream processing generator may further comprise an encoder providing tree-based encoding. The encoder may employ a block-based hierarchical representation. The encoder may also segment blocks during encoding.

In an embodiment according to the present invention, the encoder may also employ variable length encoding techniques for operators in a set of operations. The encoder may also employ tree-based variable sized blocks. The stream processing generator may compute a cumulative address offset.

Aspects of the present invention may be found in a wireless electronic device network adapted to dispense streaming updates to at least one of a plurality of electronic devices. The streaming updates may be for updating at least one of firmware and software. The wireless electronic device network may comprise a stream processing generator generating streaming updates. The stream processing generator may employ stream processing to at least one of a plurality of blocks of content. The at least one of a plurality of blocks of content may comprise a stream of bytes. The stream processing generator may process the at least one of a plurality of blocks of content until reaching an end of the stream of bytes. The wireless electronic device network may also comprise an electronic device server communicatively coupled to the at least one of a plurality of electronic devices. The electronic device server may disseminate the streaming updates to the at least one of a plurality of electronic devices. The wireless electronic device network may also comprise a streaming update processor in the at least one of a plurality of electronic devices for processing the streaming updates received from the electronic device server.

In an embodiment according to the present invention, the stream processing generator may employ a transform array to store operations needed to transform a first stream of information into a second stream of information. The stream processing generator may process the first stream and the second stream at a byte-by-byte level to generate streaming updates. Each byte may be one of a text character and a binary character of at least one of the first and second streams of information.

In an embodiment according to the present invention, the stream processing generator may maintain a minimum weight transform array wherein a minimum weight may be assigned to a set of operations. The minimum weight may be computed by employing an edit distance computation in management of an operational array.

In an embodiment according to the present invention, the set of operations may comprise at least one of a replace operation, a match operation, an insert operation, and a delete operation.

In an embodiment according to the present invention, the stream processing generator may comprise an encoder for encoding operations. The encoder may assign values to each operation in a set of operations.

In an embodiment according to the present invention, the encoder may assign a minimum weight. The minimum weight may be computed by employing appropriate weights in management of a transform array.

In an embodiment according to the present invention, the stream processing generator may comprise an encoder for encoding operations. The encoder may assign numeric values to the operations. Non-zero values may be assigned to replace operators and insert operators and zero may be assigned to match operators.

In an embodiment according to the present invention, the encoder may assign a minimum weight. The minimum weight may be computed by employing appropriate weights in management of a transform array.

In an embodiment according to the present invention, the streaming updates may comprise a difference output for two streams comprising one of binary data and text data. The difference output may comprise at least one of a tree map, operational codes for operations comprising at least one of a replace operation, a match operation, a delete operation, an insert operation, and data characters associated with at least one of the insert operation and the replace operation.

In an embodiment according to the present invention, a first stream of information and a second stream of information may be processed by the stream processing generator. The first and second streams of information may each be file-based streams. An operational array may be computed in the stream processing generator by consuming each of the file-based streams in small chunks. A small chunk may comprise one of a 64-byte block of information, a 16-byte block of information, and a 4-byte block of information.

In an embodiment according to the present invention, each small chunk of each of the file-based streams may be used to define a portion of an operational array. After encoding each operation in an encoder, the encoder may reorient to a corresponding point in each of the file-based streams to start additional encoding of a next small chunk.

In an embodiment according to the present invention, the electronic device may comprise at least one of a plurality of mobile electronic devices, and wherein the plurality of mobile electronic devices comprise at least one of a mobile cellular phone handset, personal digital assistant, pager, MP3 player, and a digital camera.

Aspects of the present invention may be found in a method of generating streaming updates by converting a first stream of information into a second stream of information for updating an electronic device. The method may comprise identifying the first and second streams of information, accessing the first and second streams of information, retrieving one block of content at a time from each of the first and the second streams of information, determining a transform operation, executing the transform operation, computing an output from the transform operation, creating a tree-based transform output from operators determined in the transform, encoding the tree-based transform output employing at least one of variable length encoding and fixed length encoding, outputting difference information into at least one memory structure, determining whether additional blocks of content are to be processed by evaluating the first and second streams of information, retrieving an additional block of content from each of the first and the second streams of information upon determining that additional blocks of content are to be encoded, continuing encoding until reaching an end of a stream of blocks of content to be encoded, compressing difference information output, and packaging the difference information output into an update.

In an embodiment according to the present invention, the method may further comprise buffering content from the first stream of information and the second stream information to determine the difference information and encoding the difference information before outputting the difference information.

In an embodiment according to the present invention, the update may facilitate conversion of the first stream of information into the second stream of information. Retrieving blocks of content from the second stream of information may be performed at a fixed pace using a fixed block size. Retrieving blocks of content from the first stream of information may performed at a variable pace using a variable block size. A reference to the second stream of information may be maintained and a cumulative offset may be computed.

In an embodiment according to the present invention, a look-ahead operation may be executed as part of retrieving blocks of content. The look-ahead operation may employ data from the first and second streams of information to compute an operational array.

In an embodiment according to the present invention, a longest common sub-string technique may be employed prior to determining a transform operation.

In an embodiment according to the present invention, illegal and unexpected operation codes may be employed as an escape sequence during encoding.

In an embodiment according to the present invention, a combination of the escape sequence, a type field of two bits, and a length representing a repetition of data associated with the type field is employed by to encode long strings of complete matches between the first and second streams of information.

In an embodiment according to the present invention, the electronic device may comprise at least one of a plurality of mobile electronic devices, and wherein the plurality of mobile electronic devices may comprise at least one of a mobile cellular phone handset, personal digital assistant, pager, MP3 player, and a digital camera.

These and various other advantages and features of novelty which may characterize the invention are pointed out with particularity in the claims annexed hereto and that form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

DETAILED DESCRIPTION OF THE INVENTION

Electronic devices may be adapted to access servers to retrieve updates for updating at least one of firmware and software. An electronic device may be, for example, a mobile electronic device having software/firmware, such as, mobile cellular phone handsets, personal digital assistants (PDA's), pagers, multimedia devices, such as MP3 players, DVD players, CD players, still and video cameras, etc. An update may comprise firmware and/or software updates that modify or change the version of a particular firmware or software installed in the electronic device, for example, upgrading to a newer version, repairing a bug in the firmware/software, etc. An update may also add new services to the electronic device or delete services, as desired by a service provider, device manufacturer, or an end-user.

An electronic device requesting access to a server may transmit an access request to the network using a first type of communication and the network may respond using the same type of communication. Alternatively, the electronic device may transmit an access request to the network using a first type of communication and the network may respond using a different type of communication. For example, the electronic device may transmit a request to the network using a short message service (SMS) and the network may respond to the request using a circuit switched or packet switched communication service, or the reverse may occur.

Figure 1:
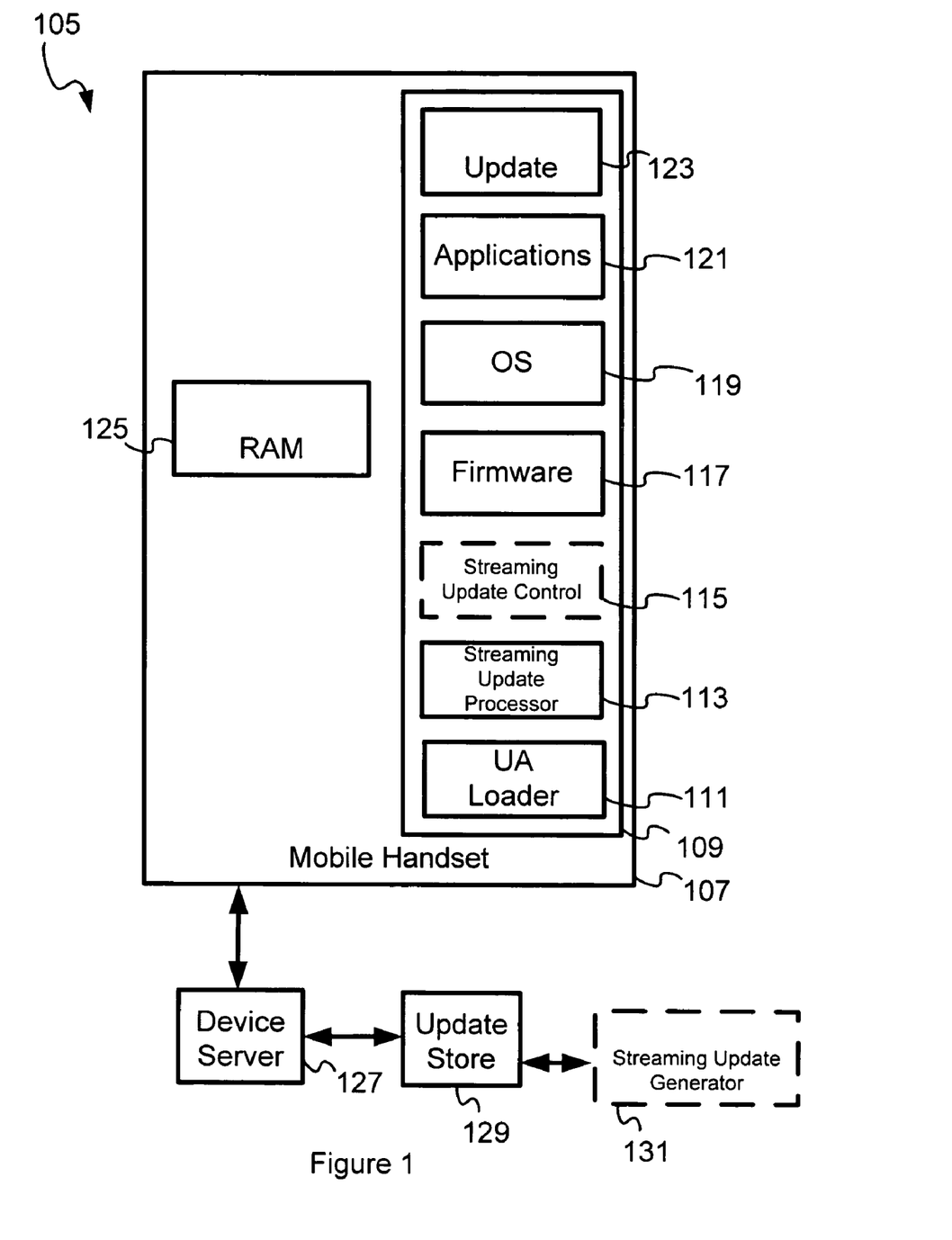
FIG. 1 is a block diagram illustrating an electronic device network adapted to dispense streaming updates to electronic devices having updatable firmware and/or software according to an embodiment of the present invention.

FIG. 1 is a block diagram illustrating an electronic device network adapted to dispense streaming updates to electronic devices having updatable firmware and/or software according to an embodiment of the present invention.

FIG. 1 illustrates an electronic device network 105 adapted to dispense streaming updates to electronic devices, for example, mobile handset 107. The electronic devices, for example, mobile handset 107, may be adapted to update firmware and/or software contained therein. The streaming updates may be generated by a streaming update generator 131 and stored in an update store 129 for retrieval by a device server 127 communicatively coupled to mobile handset 107.

The mobile handset 107 may also comprise a non-volatile memory 109 and random access memory (RAM) 125. The non-volatile memory 109 may also comprise an update 123, applications 121, firmware 117, an operating system (OS) 119, a streaming update control 115, a streaming update processor 113, and an update application (UA) loader 111.

The streaming update generator 131 may employ a technique of stream-based processing wherein blocks of content/data are continuously processed from the beginning of the stream until the end of the stream is encountered.

The streaming update generator 131 may employ an array, (that may be defined as a transform array), to store operators used to transform an original file into a streaming file. The streaming update generator 131 may process streams at the byte-by-byte level, wherein each byte may be a text character or a binary value. The streaming update generator 131 may also maintain a minimum-weight transform array wherein a weight is assigned to the operators. For example, the streaming update generator 131 may employ four operators, such as for example, a replace operator (R), a match operator (M), an insert operator (I), and a delete operator (D).

During an encoding process, values may be assigned to the operators and the values assigned may be numbers, for example. Non-zero numeric values may be assigned to operator R and operator I. Zero may be assigned to operator M. A minimum weight may be computed by employing weights in management of the transform array. A difference output for two streams of binary data or textual content (files) may comprise a tree map comprising operator codes (M, R, I, and D) and data characters associated with operator I and operator R.

In an embodiment according to the present invention, a transform may be employed in the streaming update generator 131 to process two streams, wherein each stream may be a file, an array, etc. The output may be a tree-based transform encoding that may be at least as long as a smaller of the two streams (files), and may also be smaller than the larger of the two streams (files). For example, if an original file is L1 in length and the new file is L2 in length, then the operational array, or op-array (populated with operators) may provide that: MAX(L1, L2)<op-array<L1+L2.

In an embodiment according to the present invention, an op-array may be generated from the original stream and the new stream (file) being encoded. Additionally, a minimum weight may be computed by employing edit distance in management of the op-array. Hirschberg's algorithm or an edit-distance algorithm may be employed in the streaming update generator 131 to generate the op-array. The op-array may be processed by means of tree-based transform encoding to generate difference information that may be packaged along with other related information, such as a tree map, into an output.

In an embodiment according to the present invention of the streaming update generator 131, an op-array may be computed by employing an approach that consumes the two streams (files) in small chunks, such as in 64-byte blocks. Each of the 64-byte blocks, or other such small sections of input streams, may be used to define a portion of the op-array. After encoding a first operation, processing reorients to a corresponding point in both streams to start encoding a next operation from there.

In an embodiment according to the present invention, the four operators may be represented by variable length codes based on frequency of occurrence of the associated operations. Because M is the most frequently encountered operation, operator M may be given a value of 0. R being the second most frequently encountered operation, may have a symbol of 10, etc. The average length per symbol across the entirety of the op-array may be approximately 2.

In an embodiment according to the present invention, two bits may be used to represent each of the four operations.

In an embodiment according to the present invention, the streaming update generator 131 may employ Hirschberg's techniques to determine the op-array for each block of content in the original file. Hirschberg's algorithm is specified in CACM 18(6) 341-343 1975. Hirschberg (1975) presented a method of recovering an alignment (of a longest common sub-string technique, LCS) in $O(n^2)$ time but only in linear, $O(n)$-space, i.e. Hirschberg taught that an optimal alignment from a distance matrix between two strings s1 and s2 may be recovered in $O(|s1|*|s2|)$ time and only $O(|s2|)$ space using binary-recursion. If a string contains zero characters or one character, an alignment may easily be found. Otherwise, the approach is to cut string s1 in the middle to form s1$a$ and s1$b$ and to find a corresponding place to cut string s2 into s2$a$ and s2$b$. It may be noted that s2$a$ and s2$b$ may have quite different lengths. The alignment problem may then be solved recursively on s1$a$ and s2$a$ and on sib and s2$b$. This is an example of a divide and conquer paradigm.

After conclusion of a Hirschberg computation, an op-array may be prepared. The individual operations may be encoded, employing tree-based op-array encoding. A set of N symbols may be processed to build tree structured representation of the op-array.

Figure 1A:
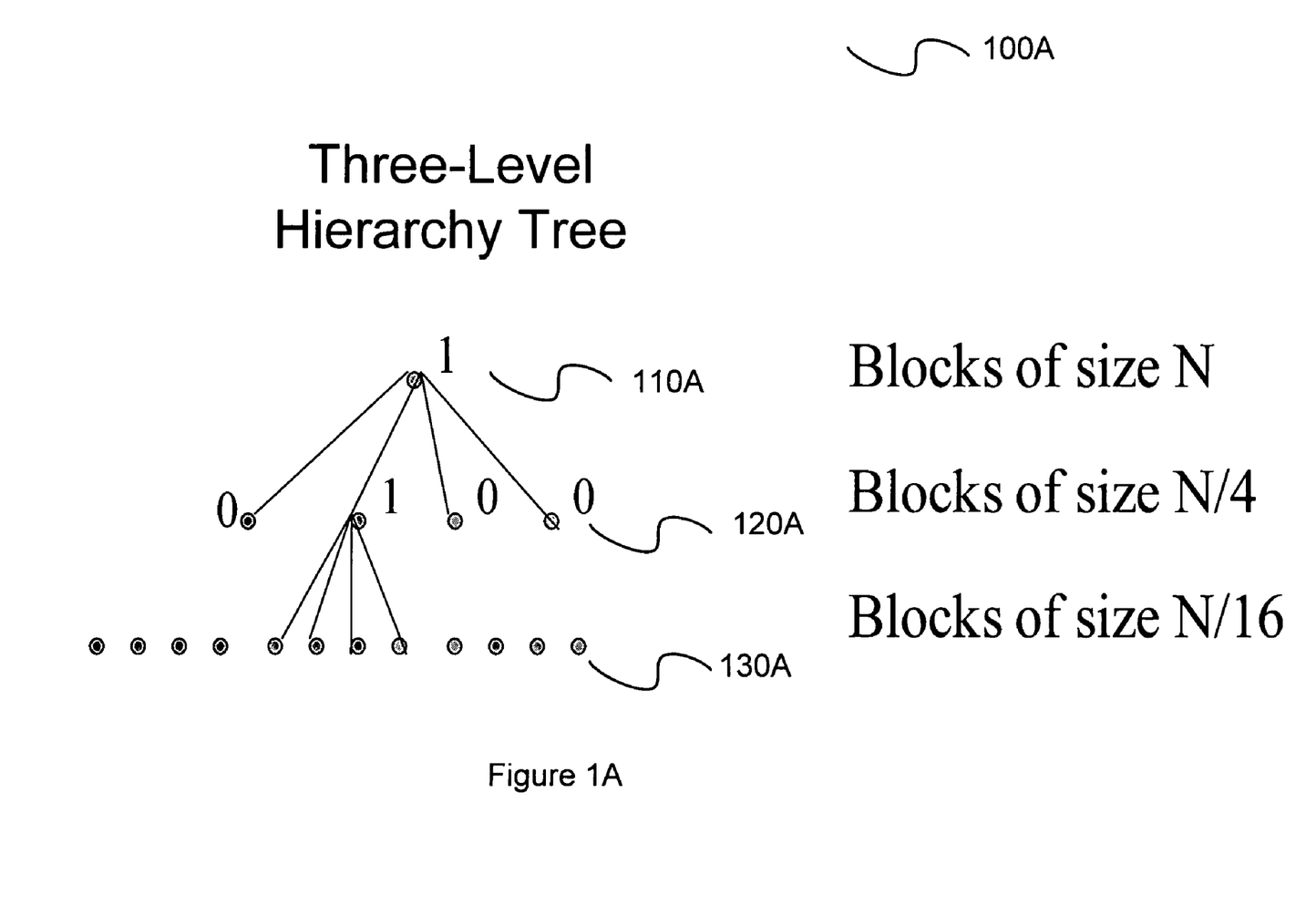
FIG. 1A is a diagram illustrating a three level hierarchy employable for encoding of a block operations according to an embodiment of the present invention.

FIG. 1A is a diagram illustrating a three level hierarchy employable for encoding of a block operations according to an embodiment of the present invention. FIG. 1A illustrates a three level hierarchy tree 100A that may be employed for encoding of a block of 64 operations, for example. In an embodiment according to the present invention, each node in top level 110A may encode N bytes. In an embodiment according to the present invention, each node in the second level 120A may encode N/4 bytes. In an embodiment according to the present invention, the nodes in the third level 130A may encode N/16 bytes. If all N bytes match, then the single bit 0 may be used in the encoding to indicate a complete match for an entire block.

Although only three levels (110A, 120A, and 130A) are illustrated in the hierarchical tree 100A in FIG. 1A, numerous additional hierarchical levels may be employed as desired. The three-level hierarchical tree 100A, as illustrated in FIG. 1A, has been employed for purposes of example. In a three-level hierarchical tree, for example 100A, each intermediate node, for example 110A, in the tree may be a sub-block, wherein one intermediate node, for example 110A, may represent 16 symbols or operators. The second level down 120A may represent 4 operation nodes, and at each node, 0 or 1 may be sent. At leaves of the tree, (i.e., third level down 130A), the op-codes may be set using variable length codes (VLC). A prefix may be significant, left to right, in each op-code. For example, the VLC for the op-codes may be set as follows: M: 0, R: 10, I: 110, and D: 111.

In an embodiment according to the present invention, a difference output created by the streaming update generator 131 may be packaged with three sections, each section containing a different type of data. For example, the tree map, such as 100A, may be located in one section at one end. Any new data character may be packaged in the beginning (for operators R and operators I) and the op-codes may be set in the middle as integers. Run length encoding, when used, employ integers for length. The new data section may be considered to be most compressible. The tree map section may often be least compressible.

In an embodiment according to the present invention, the streaming operation of the streaming update generator 131 may employ each block of N bytes at a time and build a tree upon it. When the tree representation is processed, the streaming update generator 131 may employ two pointers, one for each file or stream being compared. After processing each block of N bytes, for a next block, the current locations of the two pointers may be taken into consideration to compute a cumulative offset, which may also take into consideration op-array pointers of previous block(s). The two pointers may not always be at same relative positions and they may be advanced from their current pointer positions before processing a next block.

Pointer positions may be altered when incremented or decremented, such as by (+1) for operator D and (−1) for operator I. In an embodiment according to the present invention, the pointer for the original file or stream may be adjusted while the pointer for the new file or stream may always be advanced at steps of 64, for example. In an embodiment according to the present invention, the reverse may be true, i.e. the pointer for the new file or stream may be adjusted at each step (after processing each block) while the pointer in original file or stream may always be advanced at steps of 64, for example.

Aspects of the present invention may be found in employing a variable block size instead of fixed block sizes to the streaming update generation method. Block sizes may be reduced. Employing block-by-block processing may result in propagation of error coefficients that may be identified, consolidated, and/or repaired. In an embodiment according to the present invention, consolidation of boundary artifacts may be effected by employing a look-ahead scheme. The amount of look ahead may be adjustable, and may also be determined based upon threshold values.

In an embodiment according to the present invention, an LCS technique may be used in every block to find a next match. Using a threshold of 16 bytes, a search for an LCS may be executed.

Transforms, such as LCS and Hirschberg, may be run once for all of the blocks. Re-computing a transform array, such as an op-array, may be performed after the operators identified for the blocks involved are consumed. Therefore, the transform array may be determined once for each block.

In an embodiment according to the present invention, optimization of encoding may be employed wherein special escape sequences provide for compact encoding. For example, a tree map may be analyzed to determine whether there is any change in any portion of the tree and may employ 0 at the highest level if there are no changes in any of the sub-trees, whereas a 1 would indicate a difference in some sub-tree component. When a node has four sub-nodes, encoding 10000 is not possible, therefore 10000 may be used as an escape sequence. The sequence 10000 may therefore be used as a special instruction from encoder to decoder. Using the special instruction, directives may be communicated in the output, for scenarios such as a pure match of block by block, a run length for encoding the number of blocks, a module processing approach wherein the special instruction identifies padded areas between modules, a special escape sequence indicating a need to jump to a next module, etc.

In an embodiment according to the present invention, the streaming update generator 131 may processes two input streams (files) and discover module relocation using LCS techniques. Modules may then be aligned using information derived from the LCS techniques.

Figure 2:
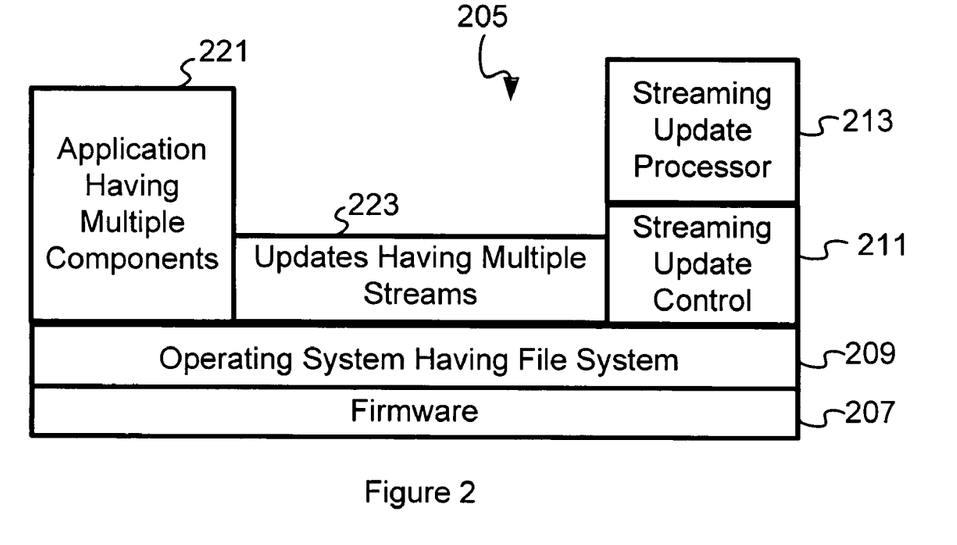
FIG. 2 is a block diagram illustrating software layers and components in an electronic device according to an embodiment of the present invention.

FIG. 2 is a block diagram illustrating software layers and components in an electronic device according to an embodiment of the present invention. FIG. 2 illustrates a mobile handset 205 comprising firmware 207 over which an operating system having file system 209 may execute an application having multiple components 221. Additionally, a streaming update processor 213 employing a streaming update control 211 accessing and manipulating streams may be executed on top of the operating system having file system 209 to update the application having multiple components 221 employing updates having multiple streams 223. In an embodiment according to the present invention, the streaming update controller 211 may be incorporated into the streaming update processor 213, as desired.

In an embodiment according to the present invention, the application having multiple components 221 may comprise a plurality of components, such as for example, an executable program, a shared library, a configuration file, etc. The streaming update processor 213, employing the updates having multiple streams 223, may be capable of updating one or more of the components of the application having multiple components 221. The updates having multiple streams 223 may contain a plurality of difference outputs packaged together, each of the plurality of difference outputs being created for, and used to update, a corresponding one of the plurality of components in the application having multiple components 221. The streaming update control 211 may be used to access and process original files or streams in mobile handset 205 to update the files to newer versions.

Figure 3:
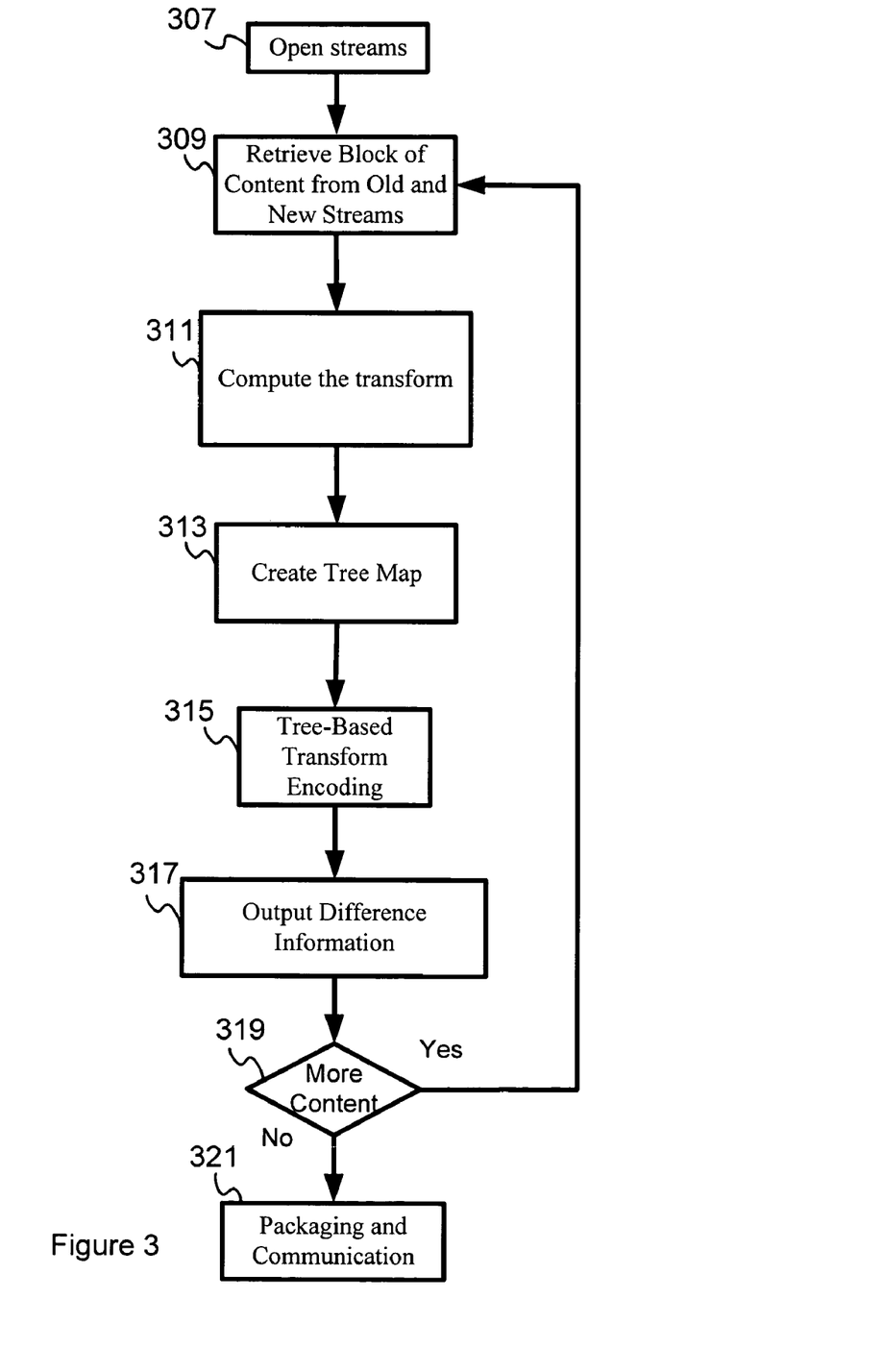
FIG. 3 is a flow chart illustrating a method for providing streaming updates according to an embodiment of the present invention.

FIG. 3 is a flow chart illustrating a method for providing streaming updates according to an embodiment of the present invention. FIG. 3 may also illustrate operation of a streaming update generator, such as streaming update generator 131 in FIG. 1. Initially, the streaming update generator may identify streams to be processed. The streams (an original and a new stream for each component to be updated) may be opened or accessed (block 307). One block of content, such as a block of 64 bytes, may be accessed or retrieved from the original and the new stream (block 309). The transform operation may be executed and the output from the transform may be computed (block 311). A tree map may be created from the operators determined in a previous transform (block 313).

Encoding of the tree-based transform output may be conducted, by employing variable length encoding or fixed length encoding (block 315). The difference information may be output to appropriate structures or resources (block 317). It may be determined whether more content is to be processed from the input streams (block 319). If more content is to be processed, then control loops back to the step of retrieving blocks of content (block 309) continuing with a next block of content. Otherwise, the difference output may be compressed, packaged, and communicated to an external repository or storage memory device (block 321).

The electronic device network 105 of FIG. 1 may employ a streaming update generator 131 to generate updates and employ a corresponding streaming update processor in an electronic device, for example mobile handset 107, to update firmware and/or software. The streaming update generator 131 may use a small buffer of content for processing original and new data files. The streaming update generator may operate on a portion of an entire file scope or a portion of an entire stream of content. Data files may also be regarded as "streams" during processing. The streaming update generator may read a portion of an entire file or a portion of an the entire stream of content to process stream/file, fetch small blocks of data, and generate difference information between streams.

Although a system and method according to the present invention has been described in connection with a preferred embodiment, the invention is not intended to be limited to the specific form set forth herein, but on the contrary, is intended to cover such alternative modifications and equivalents, as can be reasonably included within the spirit and scope of the invention, as defined by this disclosure and the appended diagrams. It is intended that the scope of the invention be limited not with this detailed description, but rather by the claims appended hereto.

What is claimed is:

1. A generator of difference information, the generator comprising:
at least one hardware computer processor that receives a first stream of information, the first stream comprising a plurality of first bytes of data, and
a second stream of information, the second stream comprising a plurality of second bytes of data;
an array storing operations for tree-based encoding of the first and second streams of information; and
wherein the generator simultaneously traverses the first and second streams of information, analyzes the plurality of first and second bytes of data encountered in the first and second streams of information, determines difference information between the first and second streams of information, and outputs the difference information between the first and second streams of information including a differencing instructions set comprising a hierarchical tree map and a plurality of operators represented by variable length codes based on frequency of occurrence of the associated operations.

2. The generator according to claim 1, wherein the differencing instruction set comprises at least one operation selected from a match operation, an insert operation, a delete operation, and a replace operation.

3. The generator according to claim 1, further comprising an encoder providing tree-based encoding, the encoder employing a block-based hierarchical representation, and the encoder segmenting blocks during encoding.

4. The generator according to claim 3, wherein the encoder employs variable length encoding techniques for operators in a set of operations, the encoder employing tree-based variable sized blocks, and wherein the generator computes a cumulative address offset.

5. An electronic device network adapted to dispense streaming updates to at least one of a plurality of electronic devices, the updates for updating one of firmware and software, the electronic device network comprising:
a generator generating streaming updates, the generator processing at least one of a plurality of blocks of content, the at least one of a plurality of blocks of content comprising a stream of bytes, the generator processing the at least one of a plurality of blocks of content until reaching an end of the stream of bytes, the generator comprising an encoder employing a tree-based hierarchy for encoding a block of operations, and wherein the generator outputs difference information including a differencing instruction set comprising a hierarchical tree map and a plurality of operators represented by variable length codes based on frequency of occurrence of the associated operations;
a server communicatively coupled to the at least one of a plurality of electronic devices, the server disseminating the streaming updates to the at least one of a plurality of electronic devices; and
a hardware computer processor in the at least one of a plurality of electronic devices for processing the streaming updates received from the server.

6. The electronic device network according to claim 5, wherein the generator employs an array to store operations used to transform a first stream of information into a second stream of information, the generator processing the first stream and the second stream in a byte-by-byte fashion to generate streaming updates, and each byte is one of a text character and a binary value of at least one of the first and second streams.

7. The electronic device network according to claim 5, wherein the generator maintains a transform array wherein a minimum weight is assigned to a set of operations, the minimum weight being computed by employing an edit distance computation in management of an operational array.

8. The electronic device network according to claim 7, wherein the set of operations comprises at least one of a replace operation, a match operation, an insert operation, and a delete operation.

9. The electronic device network according to claim 5, wherein the tree-based hierarchy employed by the encoder comprises at least three levels for encoding a block of N operations, the hierarchy comprising a top level wherein each node of the top level encodes N bytes, a second level wherein each node of the second level encodes N/4 bytes, and a third level wherein each node of the third level encodes N/16 bytes.

10. The electronic device network according to claim 9, wherein the encoder assigns a minimum weight, wherein the minimum weight is computed by employing appropriate weights in management of a transform array.

11. The electronic device network according to claim 10, wherein the encoder assigns numeric values to each operation in the set of operations, wherein non-zero values are assigned to replace operators and insert operators, and zero is assigned to match operators.

12. The electronic device network according to claim 5, wherein the electronic device network is one of a wired and a wireless network.

13. The electronic device network according to claim 5, wherein the streaming updates comprise a difference output for two streams comprising one of binary data and text data, the difference output comprising a tree map comprising operational codes for operations comprising at least of a replace operation, a match operation, a delete operation, and an insert operation, and data characters associated with at least one of the insert operation and the replace operation.

14. The electronic device network according to claim 5, wherein a first stream of information and a second stream of information are processed by the generator, and wherein an operational array is computed in the generator by consuming each of the streams in small chunks, wherein a small chunk comprises one of a 64-byte block of information, a 16-byte block of information, and a 4-byte block of information.

15. The electronic device network according to claim 14, wherein each small chunk of each of the streams is used to define a portion of the operation array, wherein after encoding an operation in an encoder, the encoder reorients to a corresponding point in each of the streams to start additional encoding of a next small chunk.

16. The electronic device network according to claim 5, wherein the electronic device comprises at least one of a plurality of mobile electronic devices, and wherein the plurality of mobile electronic devices comprise at least one of a mobile cellular phone handset, a personal digital assistant, a pager, a multimedia device, and a camera.

17. A method of generating streaming updates by converting a first stream of information into a second stream of information for updating an electronic device, the method comprising:
    identifying the first and second streams of information;
    accessing the first and second streams of information;
    retrieving one block of content at a time from each of the first and the second streams of information;
    determining a transform operation,
    executing the transform operation,
    computing an output from the transform operation; and
    creating a hierarchical tree-based transform output from operators determined in the transform, wherein the hierarchical tree-based transform output comprises at least three levels for encoding a block of N operations, the hierarchy comprising a top level wherein each node of the top level encodes N bytes, a second level wherein each node of the second level encodes N/4 bytes, and a third level wherein each node of the third level encodes N/16 bytes,
    wherein the method is enacted by a hardware computer processor.

18. The method according to claim 17, further comprising:
    encoding the hierarchical tree-based transform output employing at least one of variable length encoding and fixed length encoding; and
    outputting difference information into at least one memory structure.

19. The method according to claim 18, further comprising:
    determining whether additional blocks of content are to be processed by evaluating the first and second streams of information;
    retrieving an additional block of content from each of the first and the second streams of information upon determining that additional blocks of content are to be encoded; and
    continuing encoding until reaching an end of a stream of blocks of content to be encoded.

20. The method according to claim 19, further comprising:
    compressing difference information output; and
    packaging the difference information output into an update.

21. The method according to claim 17, further comprising:
    buffering content from the first stream of information and the second stream information to determine the difference information; and
    encoding the difference information before outputting the difference information.

22. The method according to claim 17, wherein the update facilitates conversion of the first stream of information into the second stream of information, wherein retrieving blocks of content from the second stream of information is performed at a fixed pace using a fixed block size, and wherein retrieving blocks of content from the first stream of information is performed at a variable pace using a variable block size, wherein a reference to the second stream of information is maintained and a cumulative offset is computed.

23. The method according to claim 17, wherein a look-ahead operation is executed as part of retrieving blocks of content, the look-ahead operation employing data from the first and second streams of information to compute an operation array.

24. The method according to claim 17, wherein a longest common sub-string technique is employed prior to determining a transform operation.

25. The method according to claim 17, wherein encoding a node and sub-nodes in a way indicating an impossible difference is employed as an escape sequence during encoding.

26. The method according to claim 25, wherein a combination of the escape sequence, a type field of two bits, and a length representing a repetition of data associated with the type field is employed by to encode long strings of complete matches between the first and second streams of information.

27. The method according to claim 17, wherein the electronic device comprises at least one of a plurality of mobile electronic devices, and wherein the plurality of mobile electronic devices comprise at least one of a mobile cellular phone handset, a personal digital assistant, a pager, a multimedia device, and a camera.

28. The generator according to claim 3, wherein the block based hierarchical representation employs a hierarchy of at least three levels for encoding a block of N operations, the hierarchy comprising a top level wherein each node of the top level encodes N bytes, a second level wherein each node of the second level encodes N/4 bytes, and a third level wherein each node of the third level encodes N/16 bytes.

* * * * *

UNITED STATES PATENT AND TRADEMARK OFFICE
CERTIFICATE OF CORRECTION

| | | |
|---|---|---|
| PATENT NO. | : 7,548,986 B1 | Page 1 of 1 |
| APPLICATION NO. | : 10/802191 | |
| DATED | : June 16, 2009 | |
| INVENTOR(S) | : Yang | |

It is certified that error appears in the above-identified patent and that said Letters Patent is hereby corrected as shown below:

In column 11, line 11, in Claim 13, after "least" insert -- one --.

In column 11, line 53, in Claim 17, delete "bytes," and insert -- bytes; --, therefor.

Signed and Sealed this

Sixteenth Day of February, 2010

David J. Kappos
*Director of the United States Patent and Trademark Office*